F., J. E. & C. L. NICKOLAI.
HOSE COUPLING.
APPLICATION FILED JUNE 12, 1916.

1,225,480.

Patented May 8, 1917.

UNITED STATES PATENT OFFICE.

FRANK NICKOLAI, JULIUS E. NICKOLAI, AND CARL L. NICKOLAI, OF DE BEQUE, COLORADO.

HOSE-COUPLING.

1,225,480. Specification of Letters Patent. Patented May 8, 1917.

Application filed June 12, 1916. Serial No. 103,219.

*To all whom it may concern:*

Be it known that we, FRANK NICKOLAI, JULIUS E. NICKOLAI, and CARL L. NICKOLAI, citizens of the United States, residing at De Beque, in the county of Mesa and State of Colorado, have invented new and useful Improvements in Hose-Couplings, of which the following is a specification.

Our present invention pertains to hose couplings; and it contemplates the provision of a coupling embodying such construction that it may be expeditiously and easily effected, and is capable of making connection between adjoining conduits in such manner that the employment of gaskets or other packing to prevent leakage is rendered unnecessary.

Other objects and advantages of the invention will be fully understood from the following description and claims when the same are read in connection with the drawings, accompanying and forming part of this specification, in which:

Similar numerals of reference designate corresponding parts in all of the views of the drawings.

Figure 1:
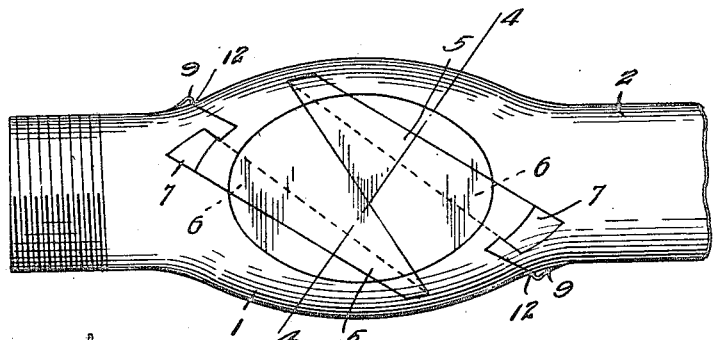
Figure 1 is a plan view illustrating a coupling constructed in accordance with our invention.
Figure 2:
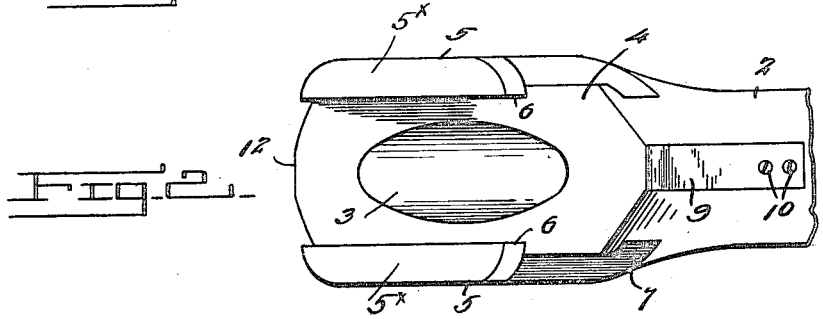
Fig. 2 is an elevation showing the inner side of the right hand coupling member.
Figure 3:
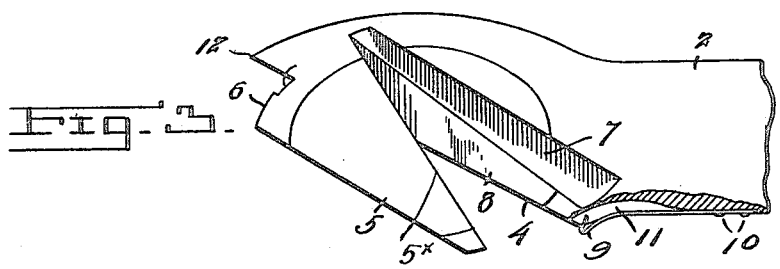
Fig. 3 is a plan of said member, *per se*, with a portion in section.
Figure 4:
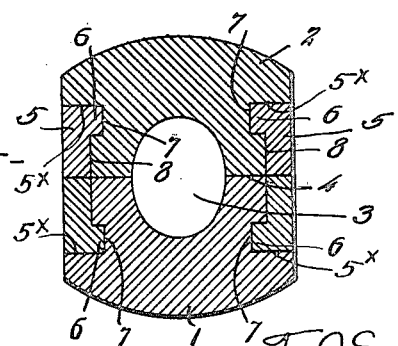
Fig. 4 is a transverse section taken through the connected members in the plane indicated by the line 4—4 of Fig. 1.

Our novel coupling comprises two members 1 and 2, each of which is equipped with a spring fastener 9, designed to engage the other in a manner hereinafter set forth. The members 1 and 2 are identical in construction with the exception that the member 1 is threaded or otherwise adapted for connection to a hose, pipe or the like, while the member 2 is illustrated in a neutral manner to indicate that it may be connected with a hose, or pipe or may be formed integral with or suitably-connected to a hydrant or other source of supply. The members 1 and 2 being as stated, identical in construction, a detailed description of the member 2 shown in Figs. 1, 2 and 3 will suffice to impart an exact understanding of both members. The said member 2 is preferably made of metal and in one piece, the spring 9 being attached to the member by screws 10 or any other suitable means. In the member 2 is formed a bore 3, and at the inner side of the member and extending from a point adjacent to the free end of the spring 9 is a face 4, disposed at an obtuse angle to the longitudinal center of the said bore 3, the end of the member indicated by 12 being adapted to be engaged by the spring 9 of the complementary member as shown in Fig. 1. In addition to the bore 3 and the face 4, the member 2 is provided with upper and lower rearwardly-tapered lugs. These lugs are provided immediately adjacent to their faces 5$^\times$ with flanges 6. The said flanges being slightly tapered toward their forward ends and being disposed at an acute angle to the face 4. It will also be observed by comparison of Figs. 2 and 3, that the member 2 is provided in its opposite sides with recesses 8 shaped in conformity to and adapted to receive the lugs 5 of the member 1, and that said recesses 8 are provided with comparatively deep grooves 7, designed to receive the flanges 6 of the member 1 and tapered in conformity therewith as illustrated.

By virtue of the two members 1 and 2 being constructed as described, it will be manifest that when the lugs 5 of the members are interlocked and are drawn into the recesses 8 until the end 12 of each member springs inwardly past the fastener 9 of the other member, the members will be wedged together, and a water tight connection will be effected between the same, and there will be no liability of the members casually moving with respect to each other. It will also be appreciated that the water-tight capacity of the coupling will be materially increased when the opposed faces 4 are ground, and therefore grinding of the faces 4 may be resorted to when the same is deemed expedient. The forcing of the faces 4 into close contact is due in a measure to the fact that the flanges 6 and their complementary grooves 7 are disposed at acute angles to the faces 4 as before described.

It will further be noted that our novel coupling does not entail the employment of gaskets or packing such as are liable to become worn or impaired after a short period of use; and it will still further be noted that the coupling when the members 1 and 2 are properly interlocked is exteriorly smooth and entirely free of abutments and other projections which renders it eminently adapted for use in fire hose. This will be appreciated as an important advantage when it is stated that the coupling characterized as stated is not liable to catch against window sills, streets curbs etc., incidental to movement of the hose.

In practice our novel coupling is preferably produced by casting the members, and then smoothly finishing the same and accurately machining the faces.

When a coupling member constructed in accordance with our invention is provided as the nozzle of a hydrant, we would have it understood that a dummy coupling member will be provided to normally close the first named member; the said dummy member being of course removed as a condition precedent to connecting a member on a hose or the like to the first-named member.

When our novel coupling is effected as shown in Fig. 1, and it is desired to disconnect the members, it is simply necessary for the operator to press the spring fasteners 9 inwardly and then move the member 1 toward the right and the member 2 toward the left until said members are clear of each other.

Having described our invention, what we claim and desire to secure by Letters-Patent, is:

1. The herein described coupling exteriorly smooth and free from abutments or projections and made up of two complementary members; the said members each comprising a face disposed at an obtuse angle to the longitudinal center of the member, inwardly tapered lugs arranged at right angles to and extending laterally relative to said face and having inner tapered flanges disposed at acute angles to the face, tapered recesses shaped in conformity to and adapted to receive the tapered lugs of the other member, and tapered grooves communicating with said recesses and disposed at acute angles to the face and adapted to receive the lug flanges of the other member, and a spring strip connected with the member and having a free portion adapted when the other member is moved home to spring outwardly and assume a position back of the same.

2. A hose coupling made up of two complementary members, each member having a longitudinal bore and also having a face disposed at an obtuse angle to the longitudinal center of the member, lugs tapered inwardly in the direction of their length and arranged at right angles to and extending laterally relative to said face, and endwise tapered recesses shaped in conformity to and adapted to receive the endwise-tapered lugs of the other member when the members are moved endwise inwardly into engagement with each other, and means on each member constructed and arranged to engage the other member and retain the members in interlocked relation.

3. A hose coupling made up of two complementary members, each member having a longitudinal bore and also having a face disposed at an obtuse angle to the longitudinal center of the member, lugs tapered inwardly in the direction of their length and arranged at right angles to and extending laterally relative to said face, and endwise tapered recesses shaped in conformity to and adapted to receive the endwise-tapered lugs of the other member when the members are moved endwise inwardly into engagement with each other, and automatic resilient means on each member constructed and arranged to spring into engagement with the other member to retain the members in interlocked relation.

4. A hose coupling made up of two complementary members, each member having a longitudinal bore and a face disposed at an obtuse angle to its longitudinal center and also having endwise-tapered, hook-like means for interlocking with corresponding means on the complementary member to force the faces of the members together in opposed relation, and automatic means for detachably fastening the members in their interlocked relation.

5. A hose coupling comprising two complementary members, each member having a longitudinal bore and a face oblique to its longitudinal center and also having endwise tapered hook-like means for interlocking with corresponding means on the complementary member when the members are hooked together and then moved endwise in opposite directions.

In testimony whereof we have hereunto set our hands in presence of two subscribing witnesses.

FRANK NICKOLAI.
JULIUS E. NICKOLAI.
CARL L. NICKOLAI.

Witnesses:
Geo. W. Heflin,
W. J. Moore.